United States Patent
Ionel et al.

(10) Patent No.: US 6,975,049 B2
(45) Date of Patent: Dec. 13, 2005

(54) ELECTRICAL MACHINE AND METHOD OF MANUFACTURING THE SAME

(75) Inventors: Dan M. Ionel, Fox Point, WI (US); Brian Branecky, Oconomowoc, WI (US); Alan E. Lesak, Franklin, WI (US)

(73) Assignee: A. O. Smith Corporation, Milwaukee, WI (US)

(*) Notice: Subject to any disclaimer, the term of this patent is extended or adjusted under 35 U.S.C. 154(b) by 56 days.

(21) Appl. No.: 10/696,132

(22) Filed: Oct. 29, 2003

(65) Prior Publication Data

US 2005/0093381 A1 May 5, 2005

(51) Int. Cl.$^7$ .............................................. H02K 37/00
(52) U.S. Cl. ...................... 310/49 R; 310/254; 310/259
(58) Field of Search ................................ 310/42, 49 R, 310/254–259

(56) References Cited

U.S. PATENT DOCUMENTS

| | | | |
|---|---|---|---|
| 4,095,161 A | | 6/1978 | Heine et al. |
| 4,267,472 A | * | 5/1981 | Sudler et al. ............ 310/49 R |
| 4,336,471 A | * | 6/1982 | Plancon .................... 310/49 R |
| 4,473,766 A | | 9/1984 | Obergfell et al. |
| 4,563,604 A | | 1/1986 | Xuan |
| 4,600,864 A | | 7/1986 | Sato |
| 4,691,132 A | | 9/1987 | Bertram et al. |
| 4,855,629 A | | 8/1989 | Sato |
| 5,118,977 A | | 6/1992 | Bertram et al. |
| 5,659,218 A | | 8/1997 | Kliman et al. |
| 5,701,047 A | | 12/1997 | Johnson |
| 5,708,406 A | * | 1/1998 | Tsunoda et al. ............ 335/272 |
| 5,780,951 A | | 7/1998 | Stephens |
| 6,012,217 A | | 1/2000 | Kliman et al. |

FOREIGN PATENT DOCUMENTS

| | | |
|---|---|---|
| EP | 0001334 | 4/1979 |
| GB | 212263 | 12/1924 |
| GB | 389570 | 3/1933 |
| GB | 730196 | 5/1955 |
| GB | 2010593 | 6/1979 |

OTHER PUBLICATIONS

Photographs of the Emerson Plaset motor; Oct. 8, 2002; 1 page.

* cited by examiner

*Primary Examiner*—Thanh Lam
(74) *Attorney, Agent, or Firm*—Michael Best & Friedrich LLP

(57) ABSTRACT

An electrical machine including a rotor and a stator. The stator includes a core and a coil disposed on the core. In one construction, the core is generally U-shaped and comprises magnetic material. The electrical machine also includes a bridge comprising magnetic material. The bridge connects the first and second legs of the generally U-shaped core. Also disclosed are methods of manufacturing the core.

33 Claims, 9 Drawing Sheets

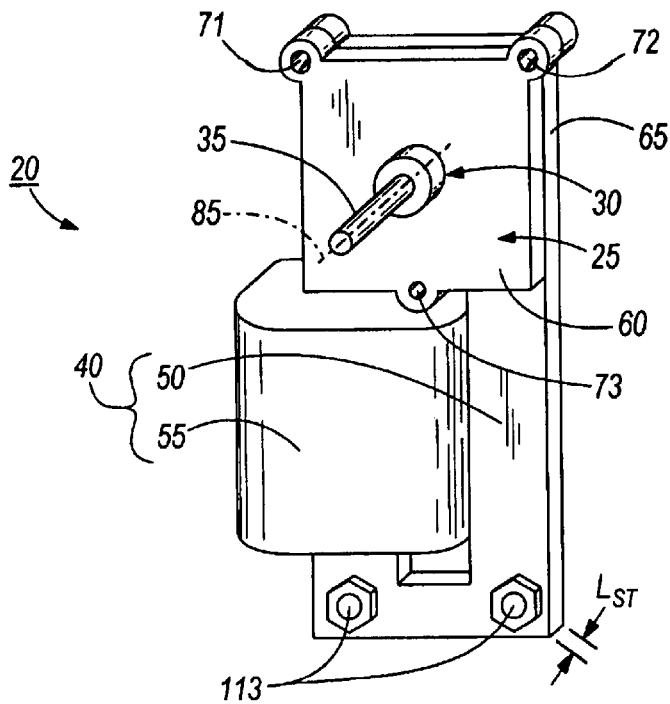
FIG. 3
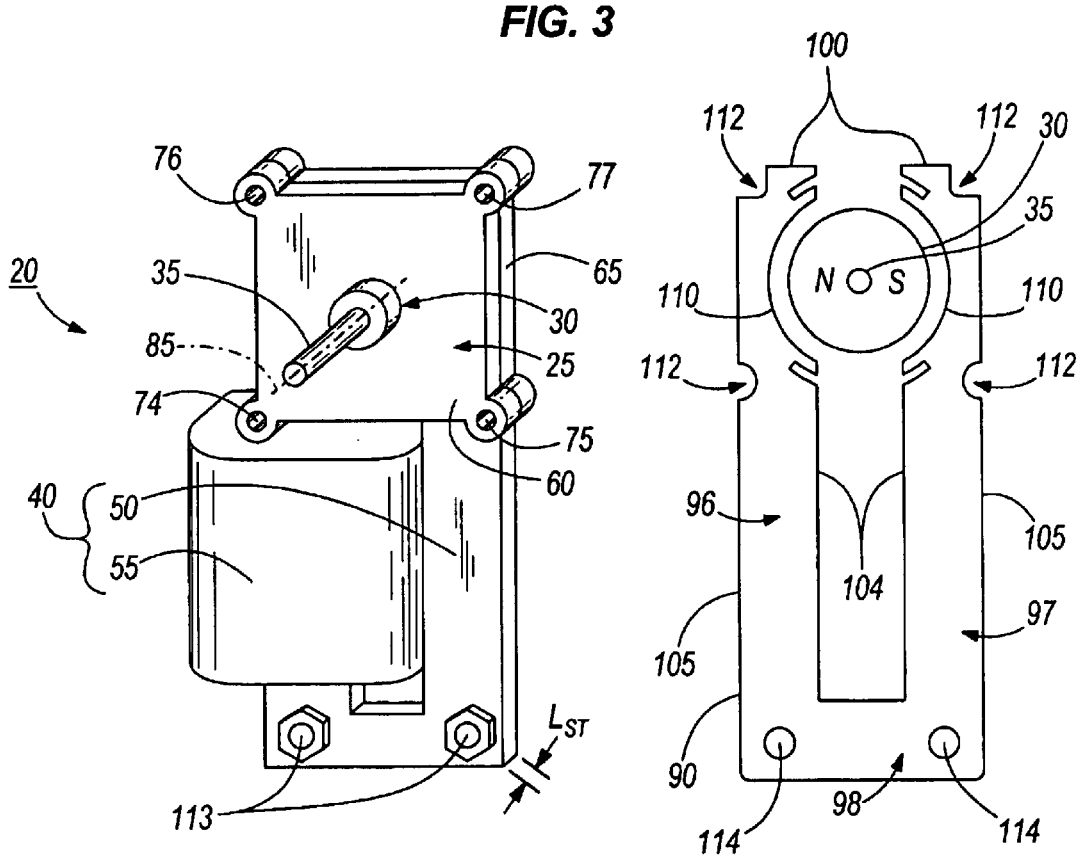
FIG. 4
FIG. 6

ELECTRICAL MACHINE AND METHOD OF MANUFACTURING THE SAME

BACKGROUND

The invention relates to an electrical machine and particularly an electrical machine with a generally U-shaped stator core.

Electrical machines with a U-shaped stator core are desirable for their simple construction and ease of manufacture. However, the large spaces of air between the two sides of a conventional U-shaped magnetic circuit result in large variations in air-gap permeance and cause cogging and ripple torque, noise, and vibration. Also, because of the specific configuration of the stator magnetic circuit, it is typically desirable to minimize the steel scrap and make best use of the materials. It is even more desirable to minimize the steel scrap in a brushless permanent magnet (BLPM) electrical machine where the rotor contains little or no steel. There is a demand for an electrical machine that minimizes the effect of cogging and ripple torque, noise, and vibration. There is also a demand to minimize the steel scrap for a U-shaped stator core. Also there is a demand for an electrical machine with a U-shaped core and a robust construction with only a reduced number of components.

SUMMARY

Accordingly, the invention provides an electrical machine including a rotor and a stator. The stator includes a core and at least one coil disposed on the core. The core comprises magnetic material and has a first leg, a second leg, and a base portion. The first and second legs include first and second surfaces, respectively. In one construction the first surface includes a first slot and the second surface includes a second slot. The electrical machine also includes a bridge comprising magnetic material. The bridge is inserted in the first and second slots.

The invention also provides a method of manufacturing a core for an electrical machine. The method includes the acts of providing a planar sheet of magnetic material (e.g., electrical steel), creating first and second generally U-shaped laminations from the planar sheet, and stacking the first and second generally U-shaped laminations. The first and second generally U-shaped laminations result from a pattern formed in the planar sheet of magnetic material. The pattern includes the first generally U-shaped lamination having a first leg and a second leg, and the second generally U-shaped lamination having a third leg and a fourth leg. The second generally U-shaped lamination is rotated one hundred-eighty degrees with respect to the first generally U-shaped lamination, and the third leg is disposed between the first and second legs.

Other features and aspects of the invention will become apparent by consideration of the detailed description and accompanying drawings.

BRIEF DESCRIPTION OF THE DRAWINGS

FIG. 3 is a perspective view of another construction of an electrical machine with a generally U-shaped stator core.

FIG. 4 is a perspective view of yet another construction of an electrical machine with a generally U-shaped stator core.

FIG. 6 is a cross-sectional view of one construction of a rotor and a lamination of the stator core used in the electrical machine of FIG. 1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising,"

or "having" and variations thereof herein is meant to encompass the items listed thereafter and equivalents thereof as well as additional items. The terms "connected," "coupled," and "mounted" and variations thereof herein are used broadly and unless otherwise stated, encompass both direct and indirect connections, couplings, and mountings. In addition, the terms connected and coupled and variations thereof herein are not restricted to physical and mechanical connections or couplings.

Figure 1:
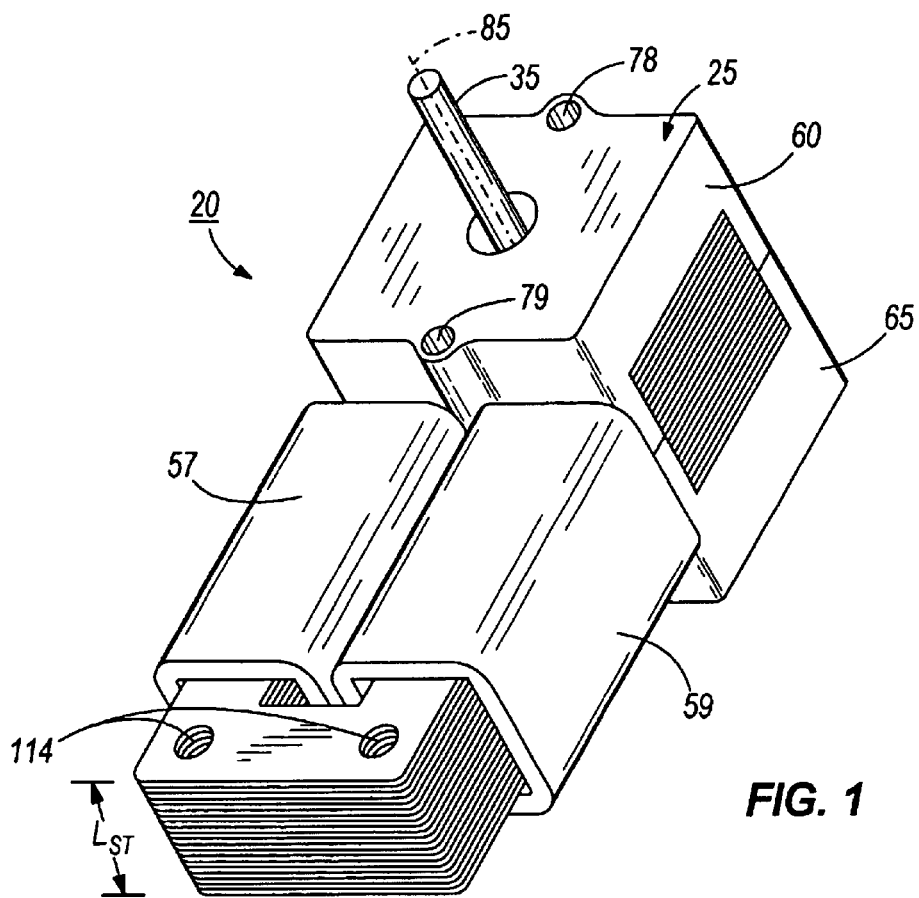
FIG. 1 is a perspective view of one construction of an electrical machine with a generally U-shaped stator core.
Figure 2:
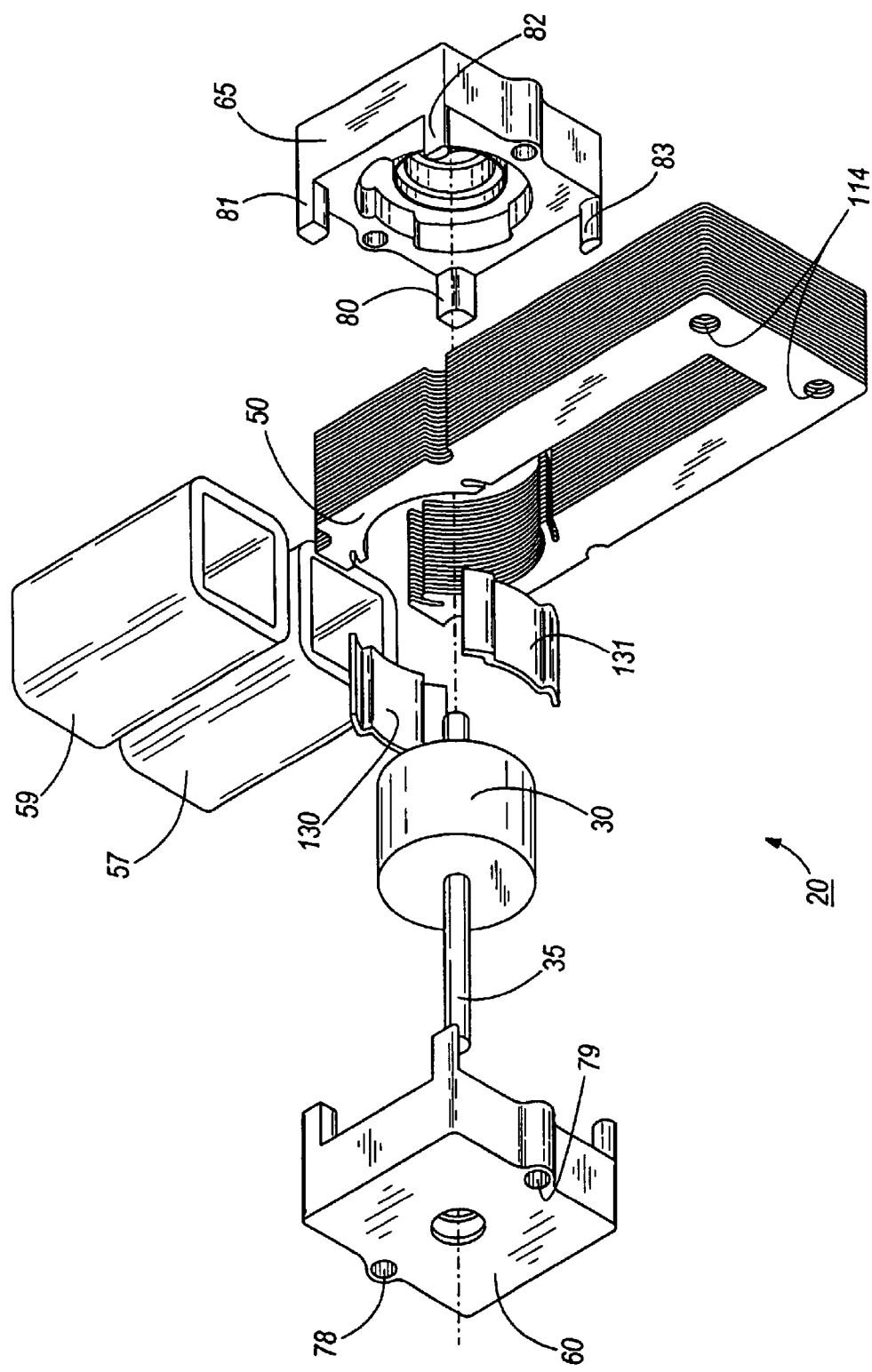
FIG. 2 is an exploded view of the electrical machine of FIG. 1.

FIG. 1 shows a perspective view and FIG. 2 shows an exploded view of a construction of an electrical machine incorporating some of the aspects of the invention. The construction shown in FIGS. 1 and 2 relates to a single-phase, two-pole, brushless permanent magnet (BLPM) electrical machine. The machine, which is shown as motor 20, includes housing 25, with a first and second endcaps 60 and 65, a rotor 30 containing permanent magnet material and coupled with a shaft 35, and a stator, which includes a core 50 and two coils 57 and 59. At least one coil is required for motor construction (see, e.g., coil 55 in FIGS. 3 and 4). The housing 25 has two openings 78 and 79 that receive a fastener (e.g., bolt, screw, rivet) coupling the first and second endcaps 60 and 65. The type of electrical machine can vary.

FIGS. 3 and 4 show other various constructions of the housing 25 for the motor 20. The housing 25 is generally square-shaped and houses, among other things, the rotor 30. Yet, the shape (e.g., circular, polygonal, etc.) and composition (e.g., plastic, steel, aluminum, etc.) of the housing 25 can vary. The housing 25 includes a first endcap 60 coupled to a second endcap 65 by a fastener. Other constructions of the housing 25 can include an intermediate portion disposed between the first 60 and second 65 endcaps. FIG. 3 shows one construction of the housing 25 having three openings 71, 72, and 73 that receive a fastener (e.g., bolt, screw, rivet) coupling the first and second endcaps 60 and 65. Openings 71 and 72 are disposed at two of the corners of the housing 25, and the third opening 73 is centrally disposed along the end surface of the housing 25 opposite the first 71 and second 72 openings. FIG. 4 shows another construction of the housing 25 having four openings 74, 75, 76, and 77 disposed at each corner of the housing 25. The type (e.g., bolts, nuts, adhesives, screws, rivets, spot-weld, etc.) of fastener used for fastening the first and second endcaps 60 and 65 can vary. In addition, the number of fasteners can vary. The housing 25 shown in FIGS. 1–4 can also include an encapsulating material (e.g., epoxy, injection molded plastic, etc.) to provide additional support of the housing 25 and core 50.

Figure 5:
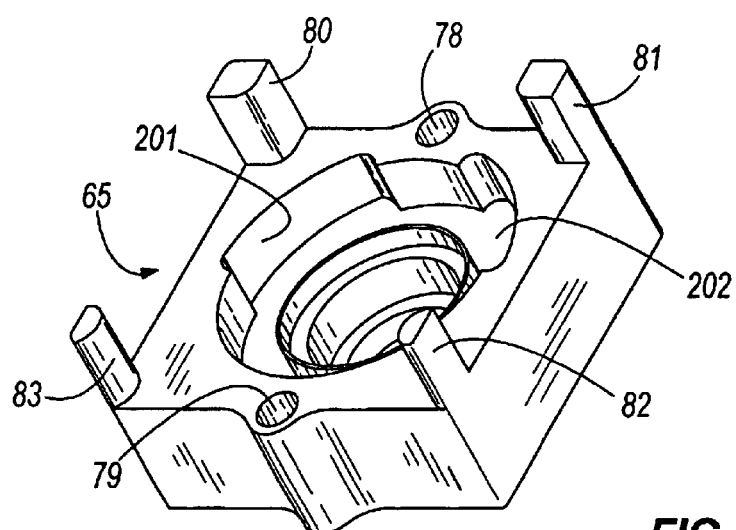
FIG. 5 is a perspective view of an endcap of the electrical machine of FIG. 1.

FIG. 5 shows a perspective view of the construction of the second endcap 65 of the housing 25 in FIG. 1. FIG. 5 shows the second endcap 65 having tabs 80, 81, 82, and 83 that insert in recesses (discussed later with respect to FIG. 6) of the core 50. The tabs 80, 81, 82, and 83 enhance support of the housing 25 and the core 50, thereby reducing vibration and noise of the motor 20.

One construction of the motor 20 is voltage controlled and relies on the back electromotive force (emf) to regulate the motor speed. For this construction, the motor 20 receives electrical power from a voltage source. The application of an electric voltage to the at least one coil 55 produces a current, which establishes an armature reaction magnetic field in the air-gap that separates the core 50 and the rotor 30. The armature reaction field interacts with the permanent magnet rotor magnetization to produce a rotational torque and cause rotor movement. The values of the applied voltage and of the back emf influence the values of the coil current, armature field and torque produced at the motor shaft. A control circuit regulates the flow of electrical power delivered to the at least one coil 55. One construction of the control circuit includes a Hall sensor operable to provide a signal representative of the position of the rotor 30. The Hall sensor provides the rotor position signal to the control circuit to determine the polarity of the voltage applied to the coil 55. The voltage polarity determines the direction of electrical current through the coil 55 and the polarity of the armature reaction magnetic field in the motor air-gap. However, the type of power source and/or voltage waveforms and/or current waveform and/or control method can vary.

FIG. 5 shows recesses 201 and 202 into the end-cap 65. These recesses provide a magnetically and mechanically convenient location for Hall devices. The type of end-cap and recesses for Hall devices can vary (see for example FIG. 19, which shows recesses 203 and 204).

FIG. 2 shows a first coil 57 and a second coil 59 wrapped around separate portions of the core 50. The first coil 57 and the second coil 59 are each connected to the power supply such as to produce in the motor air gap an armature magnetic field of the same polarity. The insulation, material, wire gauge, number of strands in hand used for the coils can vary.

FIGS. 3 and 4 show the motor 20 having a single stator coil 55 disposed on the core 50. FIG. 6 shows a cross-sectional view of the rotor 30 disposed in a lamination 90 of the core 50. The rotor 30 is separated from the core 50 by an air gap. The rotor 30 includes a permanent magnet having a pair of magnetic poles (north (N) and south (S)) of opposite polarity. The shaft 35 is coupled to the rotor and rotates about a rotational axis 85 (see FIGS. 3 and 4) of the rotor 30.

FIGS. 1, 3, and 4 show the stator core 50 having a stack length ($L_{ST}$). The stack length ($L_{ST}$) can vary. One construction of the core 50 includes a plurality or stack of laminations 90 comprising electrical steel. Different types of electrical steel or other magnetic materials can also be used. Other constructions of the stator core 50 can include a single block of magnetic material or a core of compressed powdered magnetic material.

FIG. 6 shows a cross-sectional view of one construction of a generally U-shaped lamination 90. The lamination 90 includes a first leg 96 and a second leg 97. The first and second legs are connected by a base portion 98. Each leg 96 and 97 includes a free end 100, an inner surface 104, and an outer surface 105. Each inner surface 104 includes a recess 110 having an arcuate, or curvilinear, shape to receive the rotor 30. The shape of the recess 110 can vary (e.g., circular, tapered etc). Additionally, other lamination shapes (e.g., a substantially C-shaped lamination) can be used.

Figure 21C:
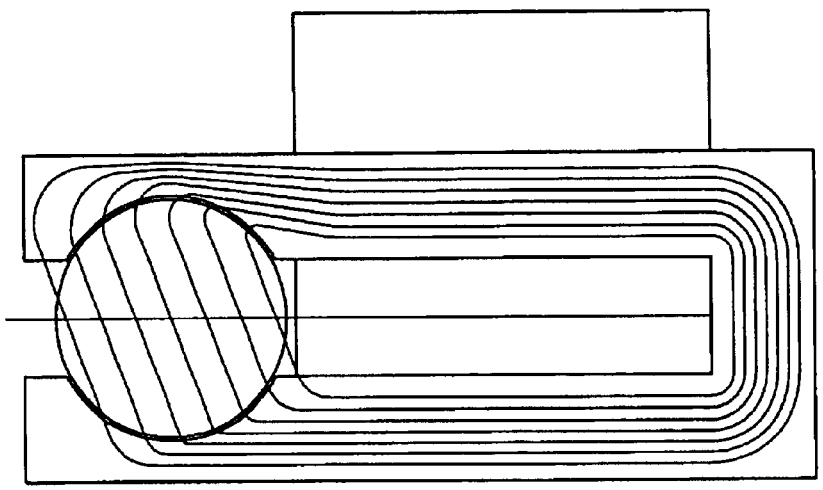
FIGS. 21A, 21B, and 21C are a cross-section of a brushless permanent magnet electrical machine with a generally U-shaped stator core at three different time instants during motor operation, the cross-section including the magnetic flux lines in the machine.
Figure 21B:
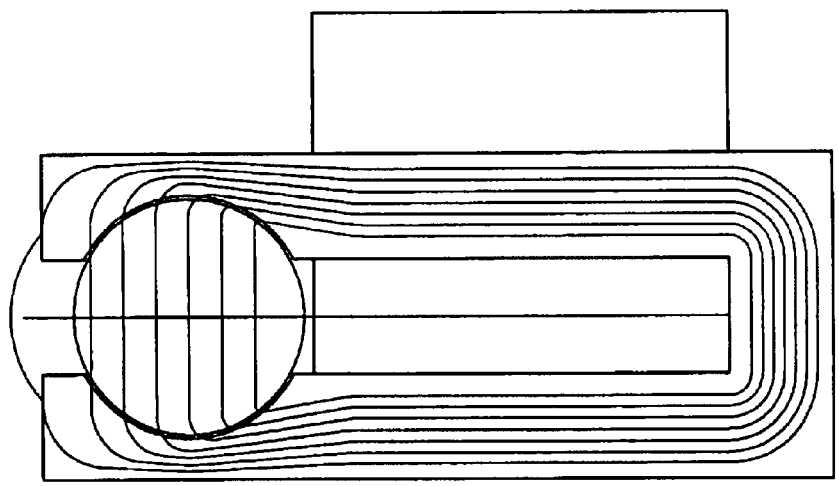
Figure 21A:
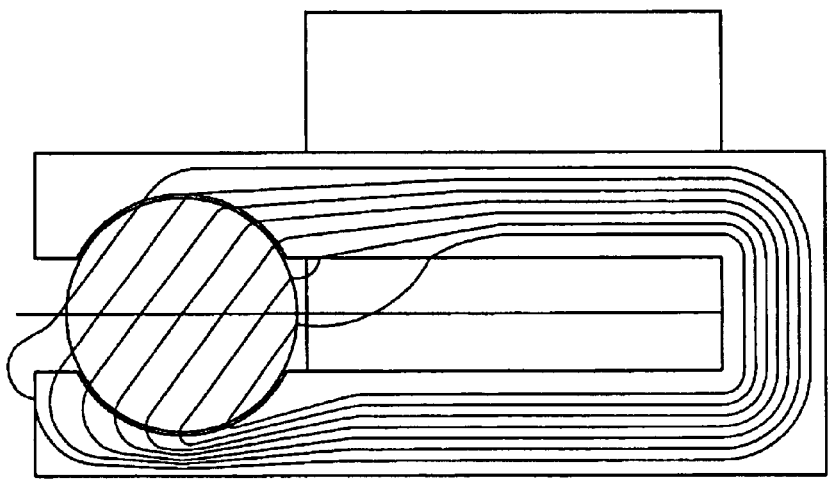

The magnetic core 50 of a rotating electrical machine 20 is conventionally produced of isotropic steel with non-oriented grain. However, in an electrical machine with a U-shaped core, as described herein, the magnetic flux lines in the lamination 90 are substantially parallel with the inner surface 104 and outer surface 105 (see FIGS. 21A, 21B, and 21C). Therefore by employing anisotropic grain-oriented steel, which is commonly used for transformers, and orienting the legs 96 and 97 along the preferred magnetization (or the "easy" rolling) direction of the steel, the magnetic circuit reluctance and the iron losses are decreased and the motor efficiency and/or specific power increased.

The lamination 90 (FIG. 6) also includes fastening slots (also referred to as recesses) 112. The slots 112 in FIG. 6 coincide with the tabs 80, 81, 82, and 83 in FIG. 5. The location, number, and shape (e.g., square, triangular, arcuate, polygonal, etc.) of the slots 112 can vary. In some constructions, the shape, size, and location of slots 112 are such as to minimize the distortion of the magnetic flux lines in the core 50 and therefore provide good motor performance.

A fastener is used to join together the laminations into a stack of laminations. For example, FIGS. 3 and 4 show one construction of a fastener including bolts and nuts 113. Openings 114 (FIGS. 1 and 2) are disposed along the base portion of the core 50 to receive the bolts. The number, type (e.g., adhesive, screw, rivet, weld, etc.), and position of the fasteners on the core 50 can vary.

Figure 7:
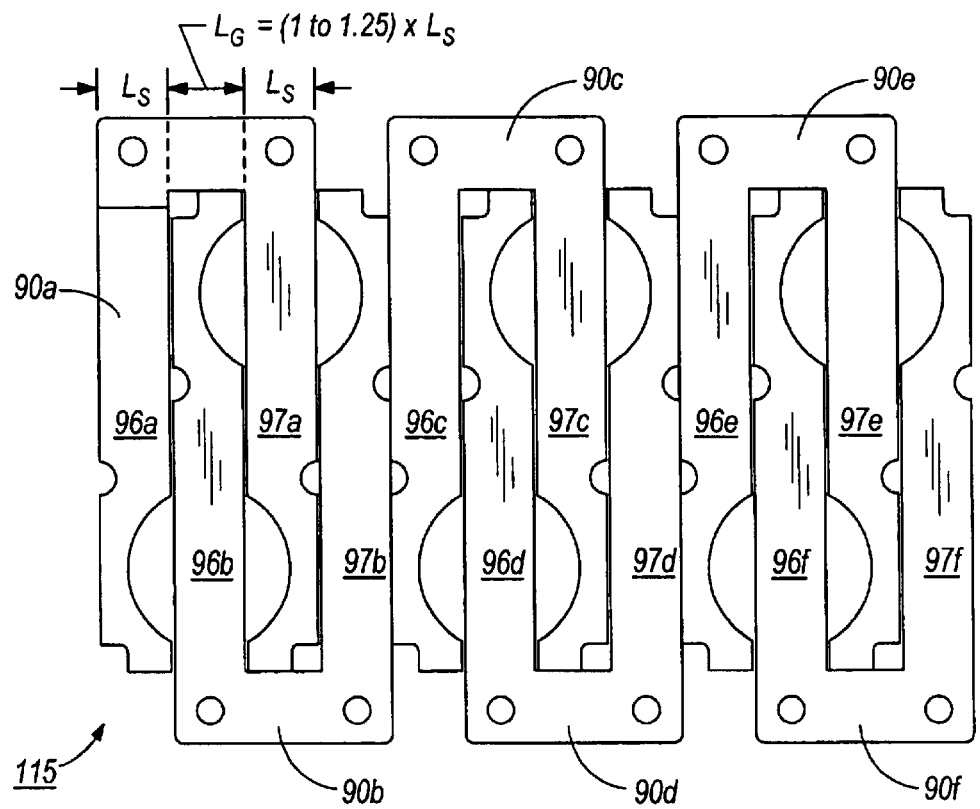
FIG. 7 is a plan view of one construction of a pattern for providing the U-shaped laminations of the stator core used in the electrical machine of FIG. 4.

FIG. 7 shows a first pattern 115 for producing a plurality of laminations 90 used in the stator core 50. The first pattern 115 includes a plurality of U-shaped laminations 90a–f having first 96a–f and second 97a–f legs with a width ($L_S$) and separated by a gap distance ($L_G$). The gap distance ($L_G$) separating the first 96a–f and second 97a–f legs ranges between (LG=(1 to 1.25)×($L_S$)). The first U-shaped lamination 90a is disposed with the free ends of the first 96a and second 97a legs directed in a first direction. A second U-shaped lamination 90b is rotated one hundred eighty degrees with respect to the first U-shaped lamination 90a. Leg 96a of the first U-shaped lamination 90a is disposed adjacent to leg 96b of the second U-shaped lamination 90b. Leg 97a of the first U-shaped lamination 90a is disposed between the legs 96b and 97b. The pattern 115 also includes a third U-shaped lamination 90c rotated one hundred eighty degrees with respect to the second U-shaped lamination 90b. The third U-shaped lamination 90c includes a leg 96c disposed adjacent to the leg 97b of the second U-shaped lamination 90b. A fourth U-shaped lamination 90d includes a leg 96d disposed between the legs 96c and 97c of the third U-shaped lamination 90c, similar to the arrangement of the first 90a and second 90b U-shaped laminations described above. Likewise, U-shaped lamination 90e having legs 96e and 97e and U-shaped lamination 90f having legs 96f and 97f are disposed similar to the arrangement of laminations 90a and 90b described above. The pattern 115 can contain any number of U-shaped laminations 90.

A second construction of the pattern 115 (FIG. 7) can include the third and fourth U-shaped laminations 90c and 90d rotated one hundred eighty degrees with respect to the first and second U-shaped laminations 90a and 90b. Leg 96d of the fourth U-shaped lamination 90d is disposed between the first 96c and second 97c legs of the third U-shaped lamination 90c. Therefore, the orientation of a coinciding pair of laminations (e.g., 90a and 90b, 90c and 90d, and 90e or 90f) can vary with respect to the other pairs of laminations.

Figure 8:
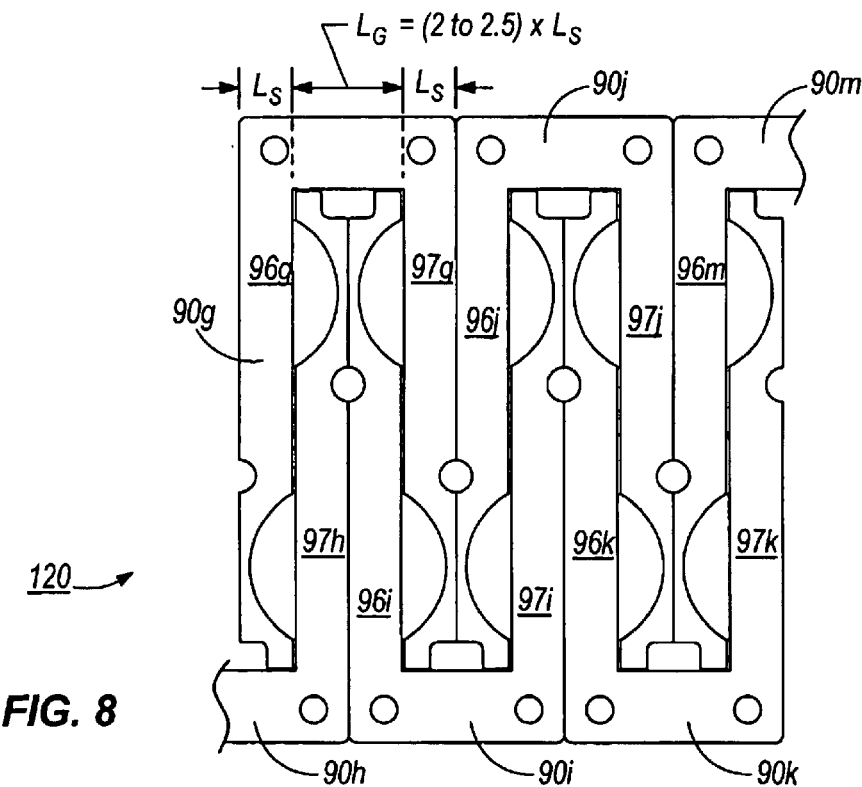
FIG. 8 is a plan view of a second construction of a pattern for providing the U-shaped laminations of the stator core used in the electrical machine of FIG. 4.

FIG. 8 shows a second pattern 120 for producing a plurality of laminations 90 used in the stator core 50. The second pattern includes a second construction of U-shaped laminations 90g–l. The U-shaped laminations 90g–l include first legs 96g–l and second legs 97g–l, respectively. The legs 96g–l and 97g–l have a width ($L_S$). The legs 96g–l and 97g–l are separated by a gap distance ($L_G$) ranging from (($L_G$)=(2 to 2.5)×($L_S$)).

The pattern 120 includes a first U-shaped lamination 90g having legs 96g and 97g. The lamination 90g is disposed adjacent to a second U-shaped lamination 90j having legs 96j and 97j. A third U-shaped lamination 90h (partially shown) and a fourth U-shaped lamination 90i are rotated one hundred-eighty degrees relative the first and second U-shaped laminations 90g and 90j. Leg 97h of U-shaped lamination 90h is disposed adjacent to leg 96i of U-shaped lamination 90i, and legs 97h and 96i are disposed between legs 96g and 97g of U-shaped lamination 90g. Leg 97g of U-shaped lamination 90g and leg 96j of U-shaped lamination 90j are disposed between legs 96i and 97i of the U-shaped lamination 90i. The pattern also includes a U-shaped lamination 90k having legs 96k and 97k rotated one hundred-eighty degrees with respect to lamination 90j. Leg 97i of U-shaped lamination 90i is disposed adjacent to leg 96k of U-shaped lamination 90k, and legs 97i and 96k are disposed between legs 96j and 97j of U-shaped lamination 90j. A sixth U-shaped lamination 90m (partially shown) having a leg 96m is rotated one-hundred-eighty degrees with respect to lamination 90k. Leg 97j of U-shaped lamination 90j is disposed adjacent to leg 96m of U-shaped lamination 90m, and legs 97j and 96m are disposed between legs 96k and 97k of U-shaped lamination 90k. The pattern 120 can contain any number of U-shaped laminations.

The above constructions of the patterns 115 and 120 minimize the scrap of material and therefore reduce material costs for the manufacture of the laminations 90. Other patterns can be used to provide the laminations 90 of the core 50. One method of removing the U-shaped laminations 90 from planar sheets of electric steel is by a stamping process. Stamping can include punching the plurality of U-shaped laminations 90 from a planar sheet using a machine or die designed with the patterns 115 and 120 described above in FIGS. 7 and 8, respectively. Other patterns and methods of providing the laminations 90 and/or the stator core 50 can be used.

Electrical machines, particularly single-phase, two-pole brushless motors, generally encounter problems with cogging and ripple torque, which can cause noise, and vibration that negatively effects motor performance. Ripple torque is characterized as a cyclical variation in a delivered torque to a load caused by the interaction of the rotor magnetic field with harmonics in the stator current magnetomotive forces (mmf's). Cogging torque describes the non-uniform torque as a result of the interaction of the rotor magnetization and angular variations in the air gap permeance (or reluctance) associated with the shape of the stator core 50 and rotor 30. For a motor 20 with a generally U-shaped stator core 50 as described above, the air-gap permeance is higher at an angular position where the rotor 30 faces a recess 110 as compared with the air-gap permeance at an angular position where the rotor 30 faces the free space in between the first 96 and second 97 legs of the core 50 (see FIG. 6). There is a demand for an electrical machine that minimizes the effect of cogging and ripple torque and that exhibits smoother operation.

Figure 9:
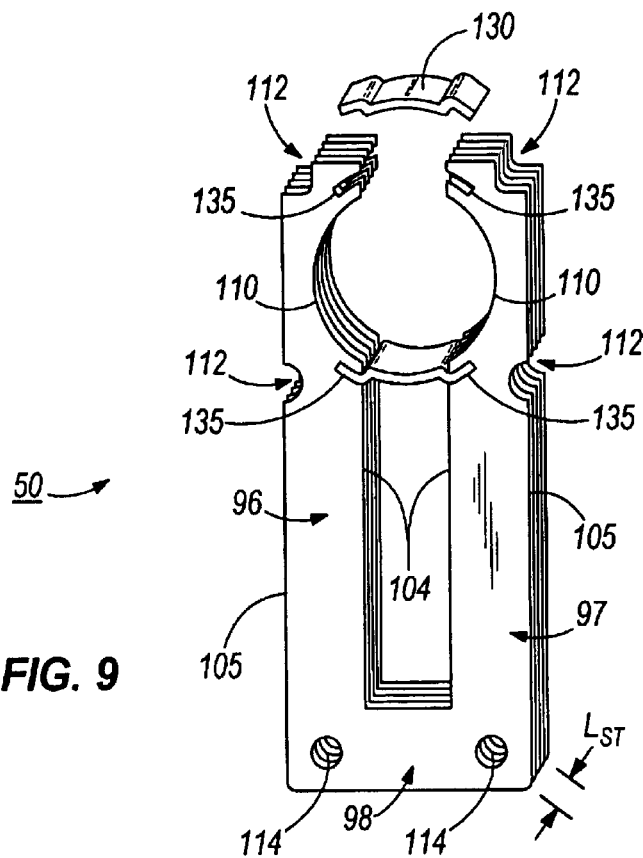
FIG. 9 is a perspective view of one construction of a plurality of bridges and a stator core used in the electrical machine of FIG. 4.

FIG. 9 shows one construction of the electrical machine of the invention that includes a pair of bridges 130 and 131 inserted between the first 96 and second 97 legs of the core 50. The material used for the bridges 130 and 131 can be selected and the shape and dimensions of the bridges 130 and 131 can be designed as to reduce the variation in the air-gap permeance and related variance in the magnetic permeance around the circumference of the rotor 30 and therefore reduce cogging torque, noise and vibration of the electrical machine 20. Also the material used for the bridges 130 and 131 can be selected and the shape and dimensions of the bridges 130 and 131 can be designed as to improve other aspects of motor performance. For example and in one construction, the material characteristics and the design of bridges influence the parking position of the rotor 30, and therefore, improve the starting capability of the electrical machine 20.

Figure 20:
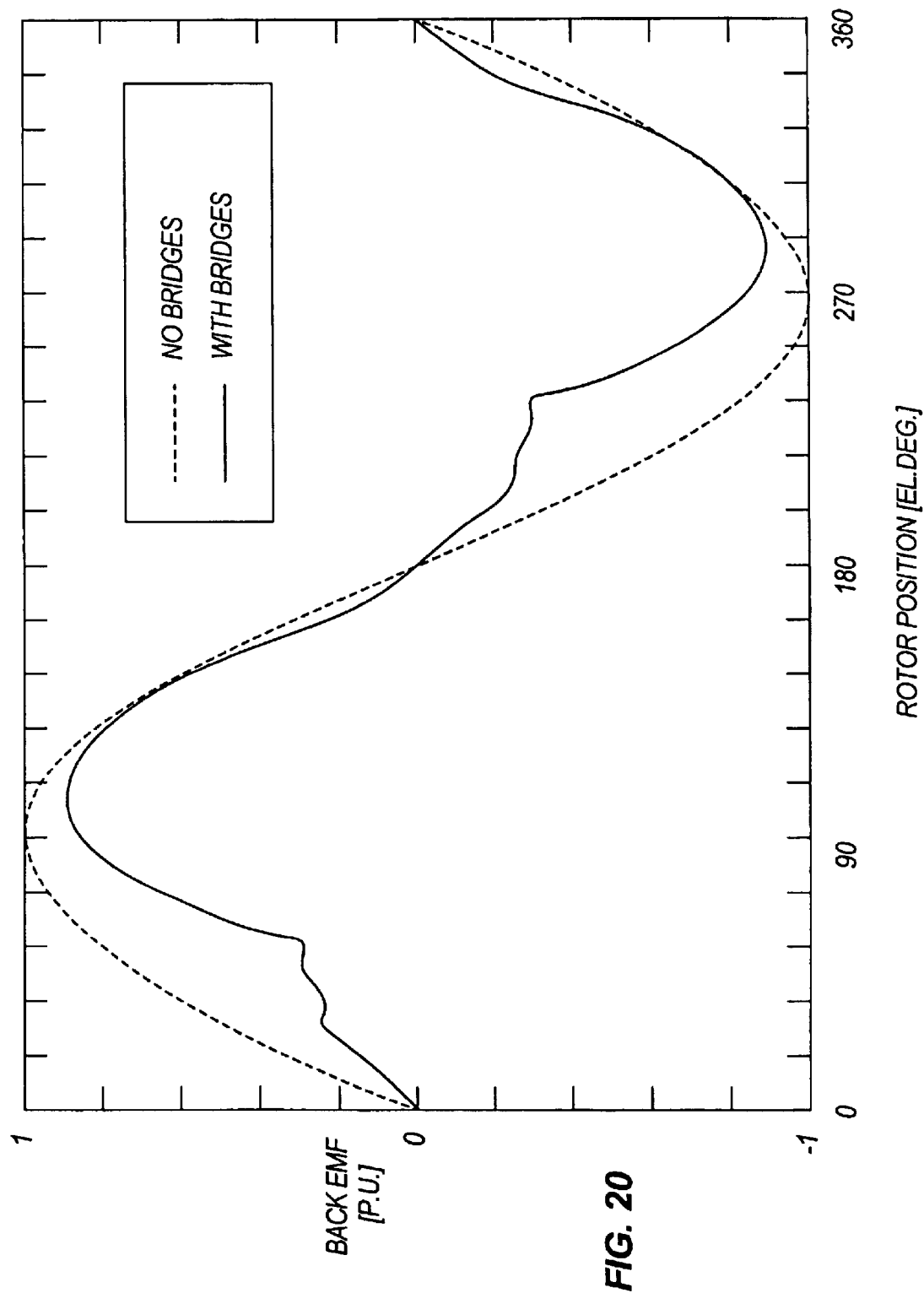
FIG. 20 is a graph showing the back electromotive force of a representative single-phase brushless permanent magnet electrical machine with a U-shaped stator core with and without magnetic bridges.

In another example construction, the material characteristics and the design of bridges influence the rotor leakage flux, the stator coil flux linkage, and the electrical machine back emf. In a single-phase electrical machine 20 with a U-shaped stator core 50 and without any bridges the back emf waveform is substantially sinusoidal (see the dotted curve from FIG. 20). In a single-phase electrical machine 20 having a U-shaped stator core 50 and including bridges inserted in between the legs of the stator core, the back emf waveform is substantially non-sinusoidal (see the continuous curve from FIG. 20). A step (plateau) in the raise of the back emf between 0 and 90 electrical degrees is beneficial in allowing the winding current to build up under the influence of the difference between the applied voltage and the back emf. As a consequence, the specific torque output and/or the motor efficiency are increased. In yet another construction, the use of the bridges modifies the motor magnetic field allowing a Hall sensor to be placed at a position that enables the phase advance of the armature current, resulting in a modification of the electric current waveform and in a reduction of torque ripple and/or increase of the specific torque output and/or increase of motor efficiency.

FIG. 9 shows slots 135 disposed along the inner surfaces 104 of the core 50. The slots 135 receive the bridges 130 and 131, and are disposed to accommodate operation of the rotor 30 and the size of the at least one stator coil 55 (see FIG. 3). Yet, the disposition of the slots 135 along the inner surfaces 104 of the first and second legs 96 and 97 can vary. The shape (e.g., slits, polygonal, elliptical, circular, arcuate, etc.) and size of the slots 135 can vary to receive the bridges 130 and 131. In some constructions, the bridges 130 and 131 are identical. The slots 135 can be angled with respect to the inner faces 104 of the legs 96 and 97 to reduce vibration of the bridges and of the electrical machine. The following includes a description of various constructions of the bridges.

Figure 10:
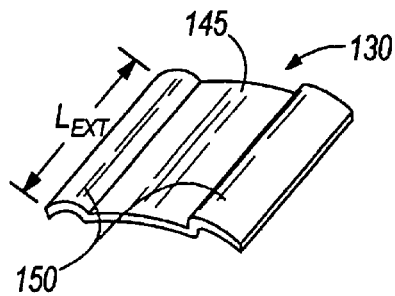
FIG. 10 is a perspective view of the bridge shown in FIG. 9.

FIGS. 9 and 10 show one construction of a bridge 130 comprised of a lamination of magnetic material. The bridge 130 includes a central portion 145 between a pair of tabs 150. The tabs 150 are disposed upward and outward with respect to the central portion 145. The tabs 150 are compatible with the slots 135 of the first and second legs of the core 50. This shape and mounting of the bridge 130 provide good mechanical strength to the electromagnetic forces. A length ($L_{EXT}$) of the tabs 150 includes the portion of the bridge 130 inserted in the slots 135. Typically, the length ($L_{EXT}$) of the tabs 150 substantially equals the stack length ($L_{ST}$) of the core 50 (see FIG. 9) to minimize magnetic field distortion. The size and dimension of the bridge 130 and respective slots 135 relates to the movement or vibration caused by the electromagnetic forces. Another construction of the bridge 130 can include ribs to reduce vibration. The bridge 130 can be pressed fitted into the core 50. In another construction the bridge 130 can be fastened to the core 50 by various means such as, but not limited to, adhesive, injected molded plastic etc.

Figure 11:
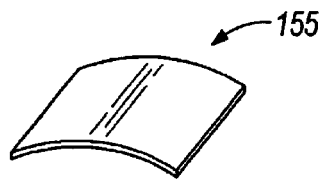
FIG. 11 is a perspective view of another construction of a bridge capable of being used with the electrical machine of FIG. 1.

As shown in FIGS. 9 and 10, the central portion 145 includes an arcuate shaped surface that reduces variation in the air gap between the slots 110 of the first and second legs 96 and 97. The shape and size of the central portion 145 can vary. Another construction of the bridge 130 can include a stack of multiple laminations of magnetic material having the shape as shown in FIG. 10. The laminations can be coupled by various fastening means (e.g., adhesive, mechanically-pressed, injection molded plastic, etc.) to produce a stack. FIG. 11 shows a bridge 155 that includes a uniformly arcuate-shaped lamination from end-to-end.

Figure 12:
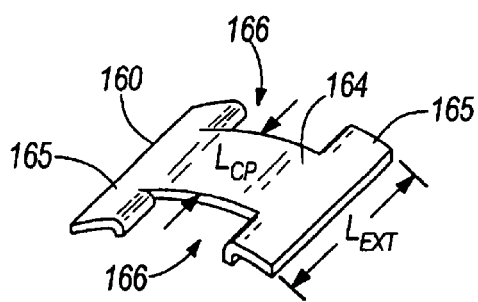
FIG. 12 is a perspective view of yet another construction of a bridge capable of being used with the electrical machine of FIG. 1.
Figure 13:
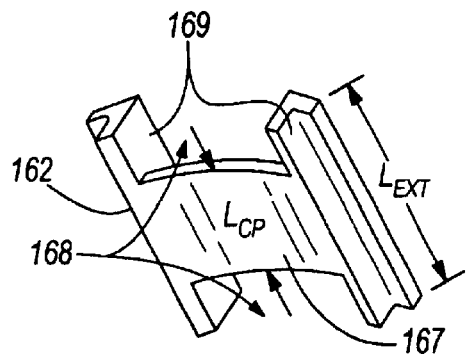
FIG. 13 is a perspective view of even yet another construction of a bridge capable of being used with the electrical machine of FIG. 1.

FIGS. 12 and 13 show constructions of a bridge 160 and 162, respectively, having a shorter central portion 164 and 167 with respect to tabs 165 and 169, respectively. The central portion 164 includes one or more central cutouts 166. The length, width, and shape (e.g., triangle, square, polygonal, arcuate, etc.) of the central cutouts 166 can vary. The central portion 164 has a central portion length ($L_{CP}$) that is less than or equal to the tab length ($L_{EXT}$) and less than the stack length ($L_{ST}$) of the core 50 (see FIG. 9). In such a construction, the magnetic flux is axially concentrated through the central portion 164 of the bridge 160 therefore increasing the values of the magnetic flux density and causing magnetic saturation. The length ($L_{CP}$) of the central portion 165 with respect to the length ($L_{EXT}$) of the tabs 167 and stack length ($L_{ST}$) of the core 50 influences the operating values of the magnetic flux density in the bridges and the equivalent air-gap permeance and therefore can be designed to improve motor performance. The space available in the cutouts 166 can be conveniently used to place a Hall sensor. FIG. 13 shows a bridge 162 including a central portion 167 with cutouts 168. The central portion 167 is offset with respect to tabs 169.

FIGS. 14–17 show other constructions of bridges 170, 190, and 200. The shape and construction of the bridges 170, 190, and 200 enhances the ability to vary the dimensions of the bridges 170, 190, and 200 and therefore to modify the equivalent air-gap permeance and improve motor performance. The bridges 170, 190 and 200 can be produced, for example, as a stack of electric steel laminations or can be made out of compressed powdered magnetic material.

Figure 15:
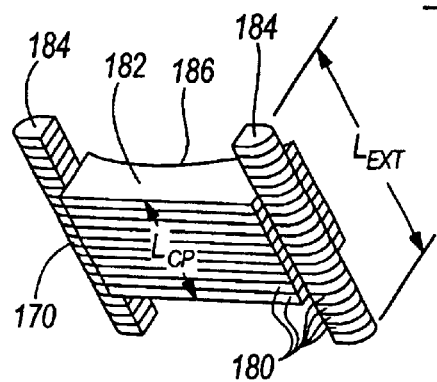
FIG. 15 is a perspective view of another construction of a bridge capable of being used with the U-shaped stator core of FIG. 14.
Figure 14:
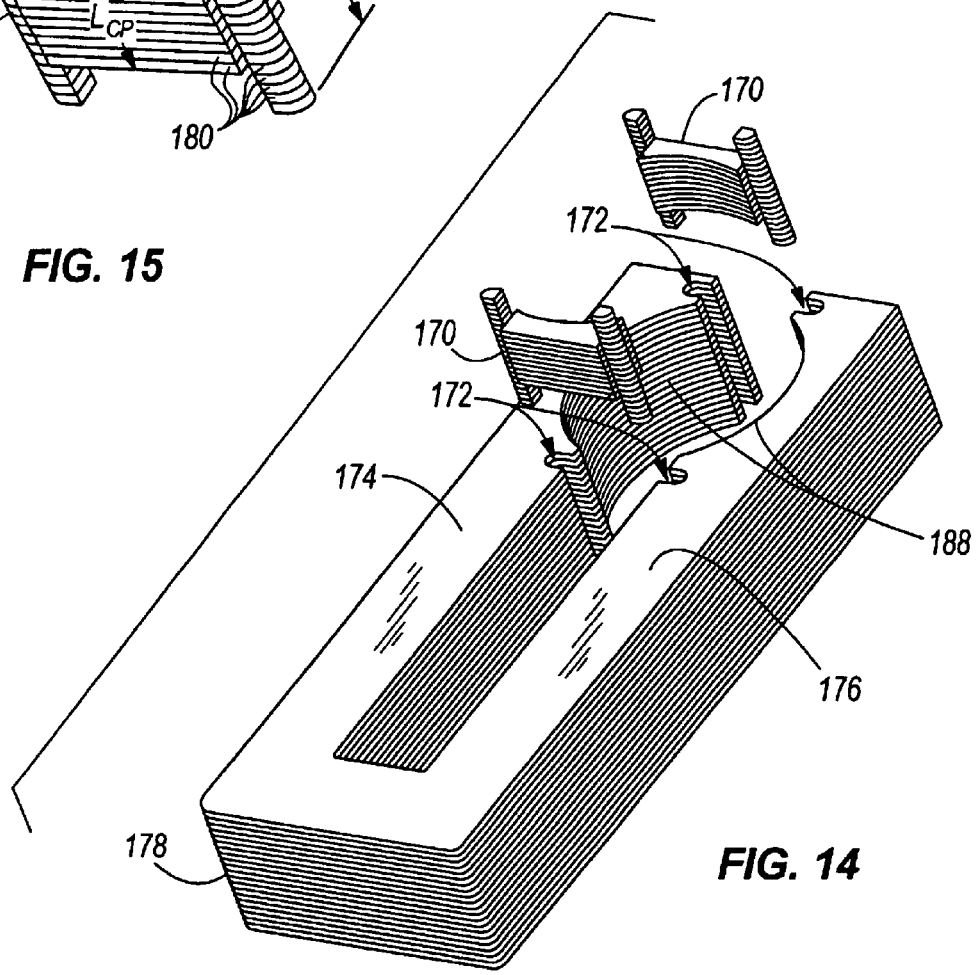
FIG. 14 is a partial exploded view of another construction of a plurality of bridges and a generally U-shaped stator core.

FIG. 14 shows a partial exploded view of one construction of bridges 170 and 171 that insert in slots 172. FIG. 15 shows a perspective view of the bridge 170. The bridge 170 includes a stack of laminations 180 of magnetic material that can be coupled using various means (e.g., adhesives, interlocking, etc.). The bridge 170 includes a central portion 182 between a pair of tabs 184. The central portion 182 includes an arcuate-shaped surface 186 that faces the rotor 30. The arcuate-shaped surface 186 provides a transition between slots 188 along the first and second legs 174 and 176 (see FIG. 14). The shape (e.g., linear, curvilinear, stepped, etc.) of the central portion 182 can vary and is designed such as to modify the equivalent air-gap permeance and improve motor performance. The tabs 184 are also arcuate-shaped and are inserted in the respective slots 172 of the first and second legs 174 and 176 (see FIG. 13). The shape (e.g., arcuate, square, polygonal, etc.) of the tabs 184 and respective slots 172 can vary.

Figure 16:
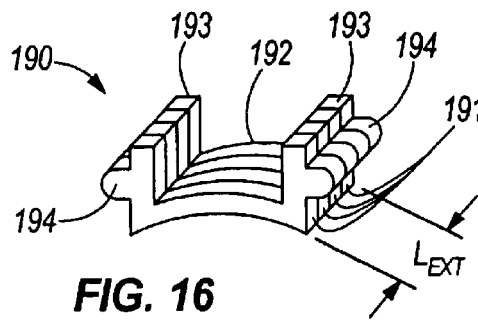
FIG. 16 is a perspective view of yet another construction of a bridge capable of being used with the U-shaped stator core of FIG. 14.

FIG. 16 shows the bridge 190 comprised of laminations 191. The bridge 190 includes a central portion 192 coupled between a pair of tabs 193. The central portion 192 is arcuate shaped, and the tabs 193 are disposed adjacent to the first 174 and second 176 legs of the core 178. Each tab 193 includes a protrusion 194 having an arcuate-shape, similar to the tabs 184 in FIG. 14, to insert in the slots 172 of the core 178. Other shapes of the tabs, protrusions and slots into the core are also possible.

Figure 17:
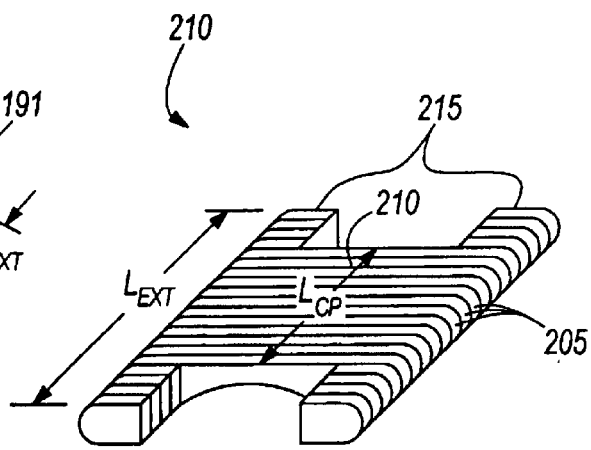
FIG. 17 is a perspective view of even yet another construction of a bridge capable of being used with the U-shaped stator core of FIG. 14.

FIG. 17 shows the bridge 200 having laminations 205. The bridge includes a central portion 210 having a length ($L_{CP}$) less than the length ($L_{EXT}$) of tabs 215.

Figure 18:
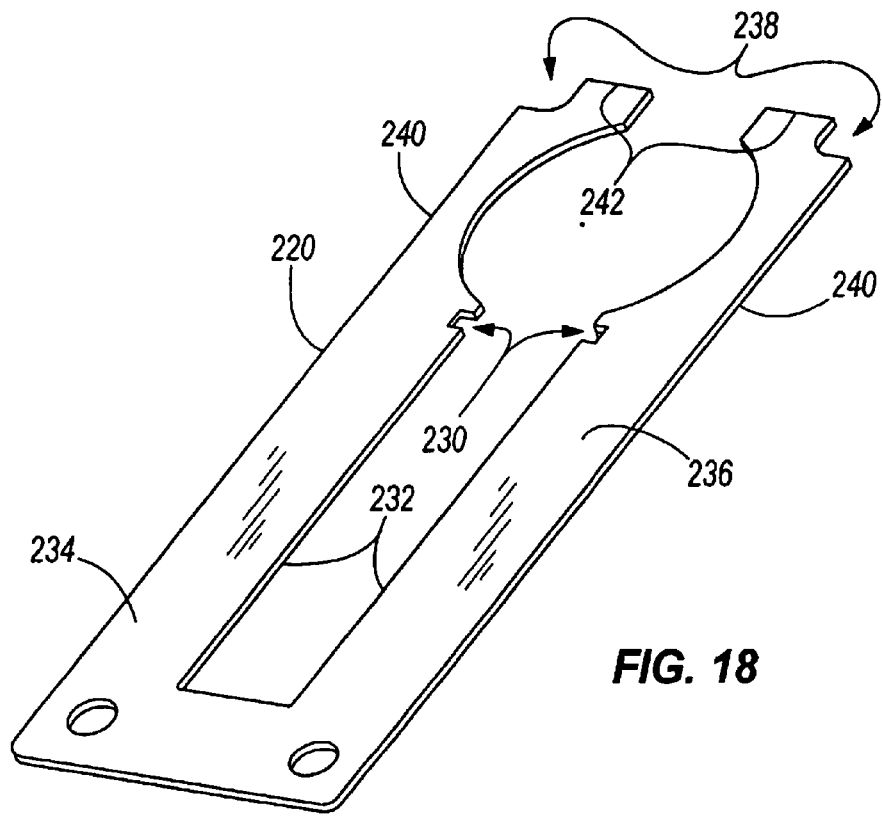
FIG. 18 is a perspective view of another construction of a lamination of a U-shaped stator core capable of being used with the electrical machine of FIG. 3.
Figure 19:
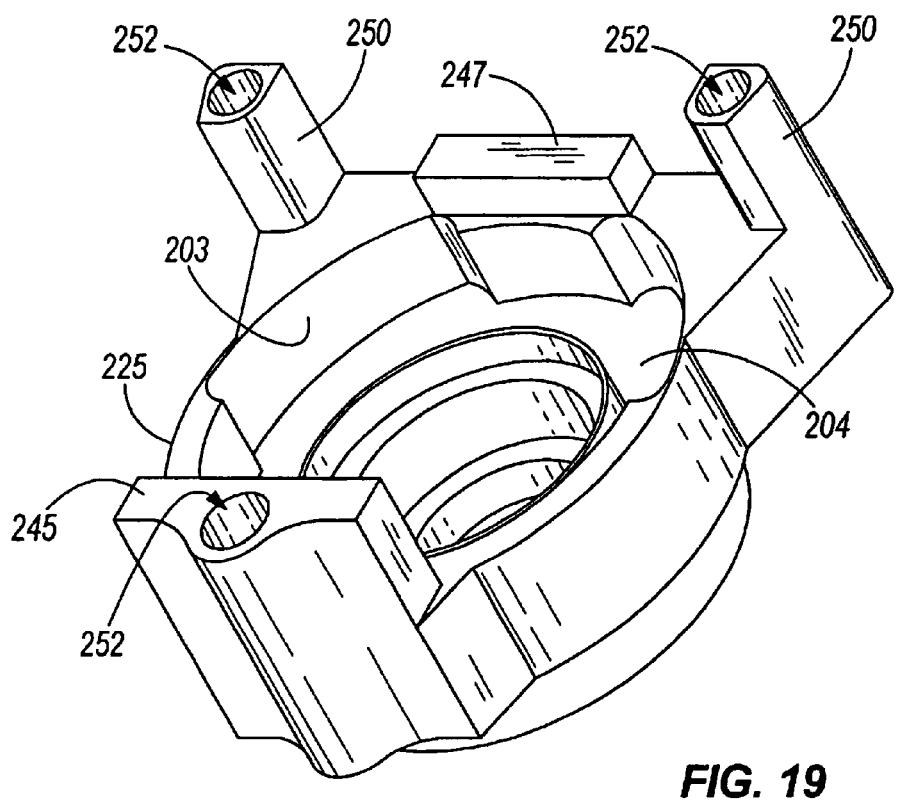
FIG. 19 is a perspective view of an endcap capable of being used with a stator including the laminations of FIG. 18.

FIG. 18 shows another construction of a stator core lamination 220. The lamination 220 includes a pair of rectangular-shaped bridge slots 230 disposed along the inner surfaces 232 of the first 234 and second 236 legs. The lamination 220 also includes a pair of fastening slots 238 disposed along outer surfaces 240 at free ends 242 of the first and second legs 232 and 234. FIG. 19 shows a construction of the endcap 225 of the housing 25 used with lamination 220. First and second bridges 245 and 247 are coupled to the endcap 225. The first bridge 245 inserts in the slots 230 of the core lamination 220 (see FIG. 18). The second bridge 247 inserts between the free ends 242 of the first 234 and second 236 legs (see FIG. 18). The endcap 225 also includes a pair of fastening tabs 250 that insert in the fastening slots 238. The first bridge 245 and each of the fastening tabs 250 includes fastening openings 252 to receive a fastening means. The endcap 225 couples by fastening means to a second endcap similar to the housing 25 described above in FIGS. 1–4. This construction of the lamination 220, endcap 225, and bridges 245 and 247 simplifies the process of assembling the motor 20.

The exploded view from FIG. 1 illustrates the preferred method of assembling an electrical machine with a U-shaped magnetic circuit as described by the invention. A core 50 is produced by stamping laminations of electric steel and fastening them to produce a stack. Coils 57 and 59 are produced by winding copper wire with a bobbin winder. At least one coil is inserted on one leg of the core 50. The non-drive end-cap 65 and the bridges 130 and 131 are attached to the core 50. The rotor 30 is inserted in between the legs of the core 50 so that the non-drive end of the shaft 35 is coupled to the non-drive end-cap 65. The drive end-cap 60 is coupled to the core 50 and the shaft 35 and fastened to the end-cap 65 through the openings 78 and 79.

Thus, the invention provides, among other things, a brushless electrical machine with a U-shaped magnetic circuit and a method of manufacturing the same. Various features and advantages of the invention are set forth in the following claims.

What is claimed is:

1. An electrical machine comprising:
   a rotor and shaft rotatable about a motor axis;
   a core comprising magnetic material and having a first leg, a second leg, and a base portion, the first and second legs including first and second surfaces, respectively, the first surface including a first slot and the second surface including a second slot;
   a coil disposed on the core; and
   a bridge comprising magnetic material and inserted in the first and second slots.

2. The electrical machine of claim 1 wherein the first and second surfaces further include first and second recesses, respectively, and wherein the first and second recesses include an arcuate shape.

3. The electrical machine of claim 2 wherein the first and second recesses are tapered.

4. The electrical machine of claim 1 wherein the core comprises a plurality of laminations having magnetic material.

5. The electrical machine of claim 1 wherein the magnetic material of the bridge includes isotropic steel.

6. The electrical machine of claim 1 wherein the magnetic material of the bridge includes anisotropic steel.

7. The electrical machine of claim 1 wherein the bridge is disposed between the rotor and the base portion of the core.

8. The electrical machine of claim 1 wherein the first surface further includes a third slot and the second surface further includes a fourth slot, and wherein the stator further includes a second bridge comprising magnetic material and inserted in the third and fourth slots.

9. The electrical machine of claim 8 wherein the first bridge is disposed between the rotor and the base portion and the second bridge is not disposed between the rotor and the base portion.

10. The electrical machine of claim 1 wherein the first leg, the second leg, and the base portion form a generally U-shaped core.

11. The electrical machine of claim 1 wherein the bridge comprises a sheet of magnetic material that includes an arcuate portion.

12. The electrical machine of claim 1 wherein the bridge comprises first and second tabs and a central portion.

13. The electrical machine of claim 12 wherein the central portion includes an arcuate surface.

14. The electrical machine of claim 12 wherein the central portion has a length along the axis, the first and second tabs have a length along the axis, and the length of the center portion is less than the length of the first and second tabs.

15. The electrical machine of claim 12 wherein the tabs are disposed upwardly and outwardly with respect to the central portion.

16. The electrical machine of claim 12 wherein the central portion is arcuate and the tabs are arcuate.

17. The electrical machine of claim 13 wherein the central portion includes a planar surface opposite the arcuate surface.

18. The electrical machine of claim 1 wherein the bridge includes a stack of laminations.

19. The electrical machine of claim 1 wherein the bridge includes a central portion and first and second tabs, the central portion including an arcuate surface disposed adjacent to the rotor and the first and second tabs being disposed in the first and second slots.

20. The electrical machine of claim 19 wherein the central portion has a first length along the axis, the core has a second length along the axis, and the first and second lengths are equal.

21. The electrical machine of claim 19 wherein the central portion has a first length along the axis, the core has a second length along the axis, and the first length is less than the second length.

22. The electrical machine of claim 1 wherein the first leg includes a third recess, wherein the electrical machine further comprises a housing having first and second endcaps, and wherein the first endcap includes a tab disposed in the third recess.

23. The electrical machine of claim 22 wherein at least one of the first and second endcaps include a recess adapted to receive a sensor.

24. The electrical machine of claim 1 and further including a housing coupled to the at least one bridge.

25. The electrical machine of claim 1 wherein the electrical machine includes an endcap, and wherein the encap includes the bridge.

26. The electrical machine of claim 1 wherein the core includes anisotropic grain-oriented steel.

27. An electrical machine comprising:
   a rotor and shaft rotatable about a motor axis;
   a generally U-shaped stator core having a first leg, a second leg, and a base portion, the first and second legs including first and second surfaces, respectively, the first surface including a first recess, a first slot, and a second slot, and the second surface including a second recess, a third slot and a fourth slot, the first and second recesses being disposed adjacent to the rotor;
   a first bridge comprising magnetic material and having a first central portion, a first tab and a second tab, the central portion including a first arcuate surface disposed adjacent to the rotor, and the first and second tabs being disposed in the first and third slots, respectively; and a second bridge comprising magnetic material and having a second central portion, a third tab, and a fourth tab, the central portion including a second arcuate surface disposed adjacent to the rotor, and the third and fourth tabs being disposed in the second and fourth slots, respectively.

28. The electrical machine of claim 27 wherein the first bridge comprises a sheet of magnetic material.

29. The electrical machine of claim 28 wherein the pair of tabs are disposed upward and outward with respect to the central portion.

30. The electrical machine of claim 27 wherein the first bridge includes laminations.

31. The electrical machine of claim 27 wherein the first leg includes a third recess, wherein the electrical machine further comprises a housing having first and second endcaps, and wherein the first endcap includes a tab disposed in the third recess.

32. The electrical machine of claim 27 wherein the core includes anisotropic grain-oriented steel.

33. The electrical machine of claim 27 wherein at least one of the first and second endcaps include a recess adapted to receive a sensor.

* * * * *